Jan. 3, 1933.  G. CARLSON  1,893,357
BRACKET FOR OUTLET BOXES
Filed May 28, 1931

Inventor:
George Carlson,
by Charles E. Muller
His Attorney.

Patented Jan. 3, 1933

1,893,357

UNITED STATES PATENT OFFICE

GEORGE CARLSON, OF BRIDGEPORT, CONNECTICUT, ASSIGNOR TO GENERAL ELECTRIC COMPANY, A CORPORATION OF NEW YORK

BRACKET FOR OUTLET BOXES

Application filed May 28, 1931. Serial No. 540,670.

My invention relates to outlet boxes and more especially to outlet boxes for use, primarily, in the wiring of houses after they have been built. It relates particularly to an outlet box provided with improved means for securing the box in position.

A large number of houses which were built before the advent of electricity or which were built before electricity was available in the vicinity have not been wired for the use of electricity. In the wiring of such houses it is necessary to use special wiring devices instead of standard devices used in wiring a house in the course of construction. In general, the standard wiring devices are designed to be placed in position before the placing of laths and plaster and so it is very difficult and sometimes impossible to place such devices in position after the house is completed. In addition, it is rather difficult to provide devices which will have universal application to houses which were not designed and built with any thought to the subsequent use of such devices.

There have been special wiring devices designed for use in the wiring of old houses which have been adapted to be mounted on the surface of the ceiling, wall, or floor and secured by means of toggle bolts or wood screws. The ceiling mounted devices are limited in depth by the fixture canopy and so only a very shallow outlet box can be used which is unsatisfactory because of the small clearance permitted between the outlet box and devices secured therein. Surface mounted switches and convenience outlets are also limited in depth but rather because of the unsightly appearance of a large device of this nature projecting from a wall or floor. In addition, shallow outlet boxes are not generally approved by authorities having the responsibility for the safe wiring of houses and other structures.

The object of my invention is to provide an outlet box which may be used in the wiring of houses after they have been completed that will have universal application, is of low cost of manufacture, of simple construction and easy to install. A further object of my invention is to provide an outlet box which has the same advantage of easy application as the surface mounted devices and at the same time may be of an adequate size to satisfy safety requirements and will not present an unsightly or objectionable appearance.

The outlet box of my invention is provided with brackets that may be placed in position easily and serve to provide a clamping surface to cooperate with a plate to clamp the outlet box in position securely.

Figure 1:
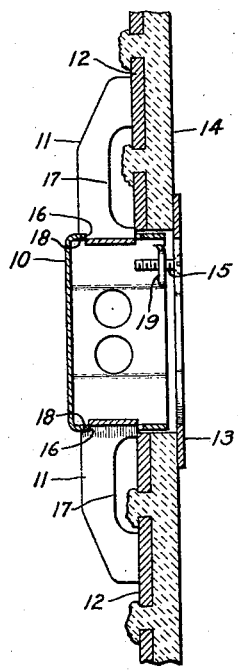
Figure 2:
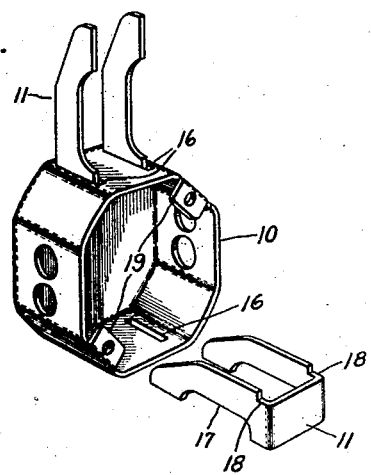

In the accompanying drawing, Fig. 1 is a cross sectional view of an outlet box located and clamped in position; Fig. 2 is a perspective view of the outlet box with one of the brackets removed.

Referring to the drawing, 10 indicates an outlet box provided with brackets 11 which provide a clamping surface to engage lath 12. To clamp the outlet box in position, a plate 13 is provided which is placed over the front of the box and engages the front of the wall 14. Plate 13 is connected to outlet box 10 by means of screws 15 which are threaded into ears 19 on the outlet box having threaded apertures. In Fig. 2 it may be seen that outlet box 10 is provided with parallel slots 16 in opposite walls. Brackets 11 are U-shaped and provided with recesses or cut-away portions 17 to permit the easy insertion of the brackets in the slots 16. Brackets 11 have shoulders 18 which are provided to seat against the wall of the box adjacent the inner ends of the slots and hold the brackets in position.

To use my outlet box in the wiring of a house which has been previously constructed, an opening is first made in the wall or ceiling where an outlet is desired. The wire or cable is then placed in position behind the wall and its ends pulled out through the opening. The insulation and armor of the cable are then removed and the cable inserted in openings in the outlet box which have been made by the removal of knockouts. The outlet box with the plate 13 attached loosely by screws 15 is then placed in position in the opening made in the wall and the brackets 11 inserted in slots 16. The outlet box is then firmly clamped in position by tightening screws 15.

The devices to be located in the box are then connected.

The outlet box of my invention is of simple construction and is adapted for ready use in the wiring of a house without any unnecessary preliminary preparation. The box is firmly held in its position without the use of wood screws or clamps which are difficult to place in position and insure a secure fastening for the box. In addition, my outlet box is of such simple construction that it may be used by persons unskilled in the use of such devices. The simplicity of the device and the ease with which it may be used to accomplish its purpose reduce the cost of material and installation.

What I claim as new and desire to secure by Letters Patent of the United States, is:—

1. In combination, an outlet box having parallel spaced slots in opposite walls, brackets of U-shape adapted to be inserted in said slots with the arms projecting outwardly from the box, a plate adapted to be placed over an opening in which the outlet box is located, and a screw passing through an opening in said plate and threaded in an aperture in said outlet box to clamp the outlet box in position with the arms of the bracket engaging the rear of the wall in which the outlet box is located and the plate engaging the front of the wall to clamp the outlet box in position.

2. In combination, an outlet box having parallel spaced slots in opposite walls, brackets of U-shape adapted to be inserted in said slots with the arms projecting outwardly from the box and having cut-away portions intermediate the ends of the arms to facilitate insertion of the bracket in the slots when the outlet box is located in an opening in a wall, a plate adapted to be placed over the opening in which the outlet box is located and having a central opening communicating with the box, and a screw passing through an aperture in said plate and threaded into an aperture in the outlet box to clamp the outlet box in the opening in the wall between the bracket arms and said plate.

3. In combination, an outlet box having parallel spaced slots in opposite walls, brackets of U-shape adapted to be inserted in said slots with the arms projecting outwardly from the box and having shoulders seating against the walls of said box to hold the brackets in position, a plate adapted to be placed over the opening in the wall in which the outlet box is located, and a screw passing through an opening in said plate and threaded into an aperture in said outlet box to clamp the box in the opening in the wall by the bracket arms and the plate.

4. In combination, an outlet box having parallel spaced slots in opposite walls, brackets of U-shape adapted to be inserted in said slots and having arms extending outwardly from the box, said arms extending from the walls of the box substantially the width of the box, a plate adapted to be placed over the opening in which the outlet box is located in the wall, a screw passing through an opening in said plate and threaded in an aperture in the box to clamp the box in position in the opening in the wall between the bracket arms and the plate.

In witness whereof, I have hereunto set my hand.

GEORGE CARLSON.